April 14, 1959     C. W. REINECKE     2,882,006
HYDRAULICALLY ACTUATED VALVE
Filed Jan. 18, 1954     2 Sheets-Sheet 1
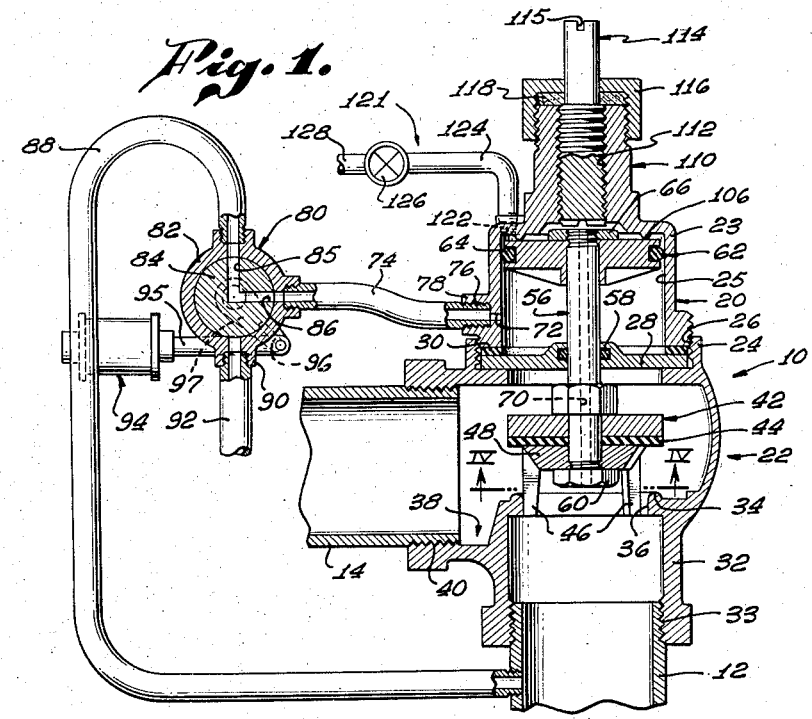
INVENTOR.
CHARLES W. REINECKE,
BY
ATTORNEY.

April 14, 1959     C. W. REINECKE     2,882,006
HYDRAULICALLY ACTUATED VALVE

Filed Jan. 18, 1954     2 Sheets-Sheet 2

INVENTOR.
CHARLES W. REINECKE,
BY

ATTORNEY.

United States Patent Office 2,882,006
Patented Apr. 14, 1959

2,882,006

HYDRAULICALLY ACTUATED VALVE

Charles W. Reinecke, Glendale, Calif., assignor to Febco, Inc., Los Angeles, Calif., a corporation of California Application January 18, 1954, Serial No. 404,595

1 Claim. (Cl. 251—26)

This invention relates generally to fluid control valves and particularly discloses a novel mechanism by which fluid flowing in a conduit may be controlled by auxiliary pressure fluid, such auxiliary pressure fluid being derived either from the fluid flow being controlled or from a separate source.

My invention finds special application in underground water systems such as those customarily used for sprinkler systems for lawns and the like. The mechanism may be easily disassembled from above and the internal parts of the valve and control mechanism may then be withdrawn for repair or replacement, all without disturbing the housing or body portion of the valve. In its preferred form my invention includes auxiliary manually controlled means by which the amount of water passed by the valve may be throttled. Moreover, means are also provided for facilitating the smooth movement of final closing of the closure member of the valve, thereby prolonging the useful life of the valve and minimizing stress on the fluid supply conduit in the system.

An object of the invention is, therefore, to disclose a novel pressure-actuated control valve for use in pressure fluid conduits.

Another object of the invention is to provide a device of the above class, including means for controlling operation of the valve by auxiliary pressure fluid.

A further object is to provide a pressure-actuated fluid-control valve, including manually actuated means for throttling the amount of water passed by the valve in full open position, and when desired, to maintain the valve in closed position until manually released.

Yet another object of the invention is to provide, in a pressure-actuated fluid-control valve, means for facilitating smooth closing movement of the valve.

These and other objects and purposes of the invention will become clear from a study of the following description of preferred embodiments thereof taken in connection with the accompanying drawings, in which:

Fig. 1 is a vertical sectional view of a normally closed valve embodying my invention, together with fragmentary portions of inlet and outlet conduits and a solenoid controlled pilot valve governing the operation of the principal valve. The valve is shown in open position.

Fig. 2 is a vertical sectional view similar to Fig. 1, the principal valve being in closed position.

Fig. 3 is a sectional view taken on line III—III of Fig. 2.

Fig. 4 is a sectional view taken on line IV—IV of Fig. 1 and particularly showing the means for facilitating smooth closing movement of the valve.

Figure 5:
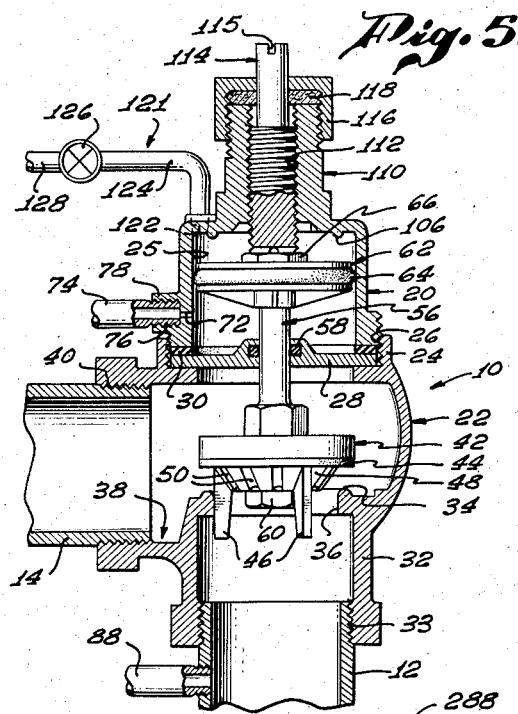
Fig. 5 is a vertical sectional view similar to Figs. 1 and 2, except that the moving parts are shown in elevation and the manual throttling means is shown maintaining the valve in substantially half open position.

Referring now in detail to the drawings and first to Fig. 1 thereof, a valve body indicated generally at 10 is adapted to be connected to an inlet conduit 12 connected to a source of pressure fluid and the valve controls the flow of fluid leftwardly, as seen in the drawing, through outlet conduit 14. The valve body 10 is hollow and includes an upper piston chamber indicated generally at 20 and a lower valve chamber indicated generally at 22. Desirably the upper piston chamber 20 is formed by an inverted cup-shaped head 23 having a cylindrical inner wall 25 and adapted to be threadedly joined to an upstanding flange 24 of valve body 10 by a threaded connection 26. A centrally apertured member 28 extends transversely of the valve body and constitutes a wall or partition defining the lower extent of piston chamber 20 and separating it from the valve chamber 22 disposed below the partition 28. Desirably the head 23 is tightened against a gasket 30 overlying partition 28 to insure that the joint is fluid tight.

With particular reference to the lower valve chamber 22 of the valve, the body 10 includes a downwardly extending sleeve 32 threadedly attached at 33 to the inlet conduit 12 previously referred to. At the upper end of sleeve 32 there is provided a preferably circular upwardly facing continuous valve seat 34 adjacent and surrounding the inlet port 36 of the valve chamber. The diameter of the valve seat 34 is appreciably smaller than that of the inner wall of head 23. The body 10 includes an outlet port indicated generally at 38 and extending, in the present illustration, leftwardly to provide threaded engagement 40 with outlet conduit 14.

A closure member indicated generally at 42 is vertically movable within the valve chamber of body 10 from an open position as shown in Fig. 1 to a closed position as shown in Fig. 2. The closure member 42 is provided with an annular resilient member 44 adapted, when the valve is in closed position as seen in Fig. 2, to seal with the valve seat 34 and thereby to prevent fluid flow through the valve.

Means are provided on the closure member 42 for insuring that the closure member moves axially relative to the valve seat 34. In the present illustration, such means include a number of downwardly depending guide members 46 adapted, during movement of the closure member, to slidingly contact the inner surface of the inlet port 36. There are three such guide members shown, and it will be understood that more might be used if desired. Means are also provided for facilitating the smooth movement of closure member 42 into closed position. The lower portion of closure member 42 is provided with a generally frustoconical member 48, the inclined outer surface of which is provided with a plurality of circumferentially disposed spaced indentations or channels 50 (see Figs. 4 and 5) whose purpose will be later explained.

An actuating rod indicated generally at 56 is disposed vertically and extends through the apertured transverse partition or wall 28. Suitable means such as O-ring 58 may be provided in wall member 28 to permit rod 56 to be hermetically slidable through the aperture of the wall member. The closure member 42 heretofore described is fixed to the lower end of rod 56 by suitable means, such as a nut 60 threaded to the lower end of rod 56 and serving to retain the apertured closure member 42 and rod 56 in assembled relation as shown.

Within the upper piston chamber there is slidably mounted a piston indicated generally at 62 preferably including means such as O-ring 64 hermetically sealing with the inner cylindrical wall 25 of the head 23. The piston 62 is desirably centrally apertured and is fixed to the upper end of rod 56 as by a threaded nut 66 retaining the parts in assembled relation as shown.

Figure 7:
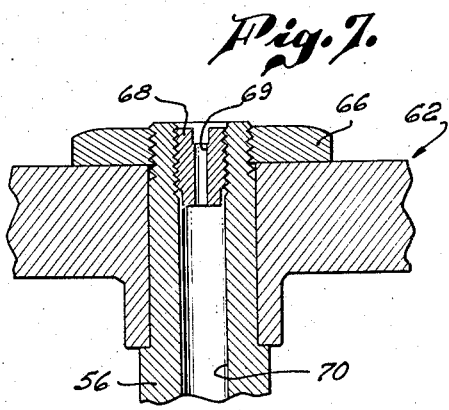
Fig. 7 is a fragmentary view, on an enlarged scale, of a removable insert which may be used in the embodiment shown in Figs. 1, 2 and 5.

It will now be seen that piston 62, rod 56 and closure member 42 are fixedly joined together so that they move vertically in unison. Such vertical movement is caused in the present invention by differential fluid pressures existing above and below the piston 62 within the piston chamber 20 and below the closure member 42. For this purpose means are provided for introducing pressure fluid contained within inlet conduit 12 into piston chamber 20 above piston 62, such means including a longitudinal hollow channel 70 extending throughout the entire length of rod 56, communicating the upper portion of piston chamber 20 with inlet conduit 12. To control flow through channel 70, I may provide a removable insert 68 (see Fig. 7) threadedly received in rod 56 and provided with an orifice 69 preferably coaxial with the bore 70 and smaller than the latter. Thus the user, by selecting an insert having an orifice of desired size, may control the speed of operation of the valve and adapt the device to varying condition of water pressure and the like affecting operation.

Means are provided for selectively introducing pressure fluid into the lower portion of piston chamber 20. Such pressure fluid may be derived either from an auxiliary source of pressure fluid and controllably supplied to the piston chamber 20, or, alternatively, such fluid may be supplied from the inlet conduit 12, as shown herein.

In the side wall of head 23 of the piston chamber 20 and spaced below the lowermost limit of travel of piston 62 is a relatively narrow passageway or channel 72 communicating with a conduit 74 threadedly joined at 76 with boss 78 formed in the lower portion of head 23. Means are provided for selectively supplying pressure fluid to conduit 74 or relieving pressure fluid therefrom. Illustrating such means are here shown as including a control or pilot valve schematically generally indicated at 80 and connected to conduit 74. The control valve 80 includes a cylindrical housing 82 and a piston or plug 84 rotatably mounted within the housing. A pair of intersecting angularly spaced radial channels 85 and 86 are formed in the plug 84 and a conduit 88 is attached to housing 82 and communicates with plug 84 at a point angularly spaced from the point of attachment of conduit 74. Conduit 88 is adapted to be connected to a source of pressure fluid as will be more fully described hereinafter. A third connection is provided in housing 82, this third point being indicated at 90 and communicating with waste or discharge conduit 92. The angular displacement between radial channels 85 and 86 as well as the successive angular displacements between the various connection points to the housing 82 are so chosen as to afford communication either between conduits 88 and 74 or between conduits 74 and 92.

Means are provided for rotating the plug 84 within housing 82 from the position shown in Fig. 1, to a position 90° clockwise therefrom. Such means are illustratively shown as including a solenoid indicated generally at 94 having a linearly reciprocable plunger 95. The outer end of the plunger is slidingly pivotally connected to a radial slot 96 formed in radial arm 97 which in turn is fixed to the rotatable plug 84 of control valve 80.

Desirably the solenoid 94 or other means used to actuate the pilot valve 80 is arranged so that when not energized the parts will be in such a position as to afford communication between conduit 74 and conduit 92. Thus the parts as shown in Fig. 1 represent the situation existing when solenoid 94 is energized and communication thereby established between conduit 88 and conduit 74 by reason of the connected channels 85 and 86 of rotatable plug 84.

It will be recalled that the internal diameter of the piston chamber 20 is somewhat greater than the diameter of inlet port 36. By reason of the axial channel 70 communicating pressure fluid from inlet conduit 12 into the upper portion of piston chamber 20, the pressure existing above piston 62 is always that existing in inlet conduit 12. When the fluid in piston chamber 20 below piston 62 is bled or relieved to atmosphere or waste through conduits 74 and 92, it will be understood that the movable parts of the valve will be urged downwardly into the closed position shown in Fig. 2 because of the greater area of piston 62 exposed to pressure fluid as compared with the area of the closure member 42 so exposed. Contrariwise, when pressure fluid is introduced into piston chamber 20 beneath piston 62 through conduits 88 and 74, and if such introduced pressure fluid exerts sufficient force upwardly against piston 62, then the axially movable parts of the valve will be urged into their upper or opened position.

In order to insure that pressure fluid in the upper portion of piston chamber 20 may freely circulate, means are provided for spacing the upper surface of piston 62 downwardly from the top of piston chamber 20 when the parts are in their uppermost position. Such means are here shown as including one or more spacing bosses 106 projecting downwardly from the upper wall of head 23 and adapted to abut the upper surface of piston 62 when the valve is fully opened as in Fig. 1.

Means are provided for adjustably limiting the fully opened position of the valve. In the upper portion of head 23 there is provided a longitudinally extending, preferably integrally formed sleeve indicated generally at 110 and provided with an internally threaded bore 112 therethrough. A rotatable rod indicated generally at 114 includes a lower threaded portion engaging the threaded bore 112, the lower end of rod 114 being adapted to abut the upper end of piston rod 56, the two rods being axially aligned. A conventional apertured cap 116 is threadedly attached to the upper end sleeve of 110 and suitable conventional packing means 118 may be provided to prevent leakage upwardly along rod 114. The upper end of rod 114 is provided with means for facilitating rotation of the rod. In the present illustration such means include a screwdriver slot 115 and it will be understood that a manually graspable handle might be used if desired.

Comparison of Figs. 1, 2 and 5 will clearly show the limiting or throttling operation of the valve by the use of rotatable rod 114. When it is desired that the upper end of piston rod 56 not be permitted to rise beyond a certain predetermined point, the rod 114 may be manually screwed downwardly so that its lower end is at the desired point. It is to be noted that, below such point, operation of the valve by pressure fluid control is accomplished as described hereinabove and independently of the position of manual throttling rod 114. Furthermore, the throttling rod 114 may be screwed completely down so that the valve is maintained in closed position regardless of the pressure introduced into piston chamber 20 by conduit 74. Desirably the lower end of rod 114 is provided with a plurality of radially disposed recessed channels or grooves 120 to insure that pressure fluid moving upwardly through channel 70 of rod 56 is permitted to pass outwardly into the upper portion of piston chamber 20 above piston 62.

It may at times be desirable to control the operation of the present valve by manual means. Such occasions may arise, for example, if the solenoid is inoperative as by reason of power failure or the like. To accomplish this objective I may provide manually controllable means for bleeding liquid from the upper portion of piston chamber 20 at a more rapid rate than liquid is supplied thereto through channel 70 and orifice 69. Such means are indicated generally at 121 and include an outlet port 122 formed in the upper wall of the piston chamber 20 and a pipe 124 connected thereto. A manually operated valve 126 is provided in the pipe 124, and the outlet pipe 128 from valve 126 may terminate at any point where water may be used such as an auxiliary sprinkler when the present valve is used in a sprinkler system.

Since the capacity of means 121 is greater than that of orifice 69 in terms of water flow, it will be seen that when valve 126 is open, no substantial pressure can build up in piston chamber 20 and hence the principal valve 10 will assume its open position as shown in Fig. 1 regardless of the position of control valve 80. Moreover, since the control valve 80 is preferably arranged to be normally open when not energized, i.e., with communication existing from conduit 74 to bleed conduit 92, only atmospheric pressure exists below piston 62 in the piston chamber 20. Consequently, opening and closing of valve 126 will cause opening and closing, respectively, of the closure member 42 of principal valve 10.

Figure 6:
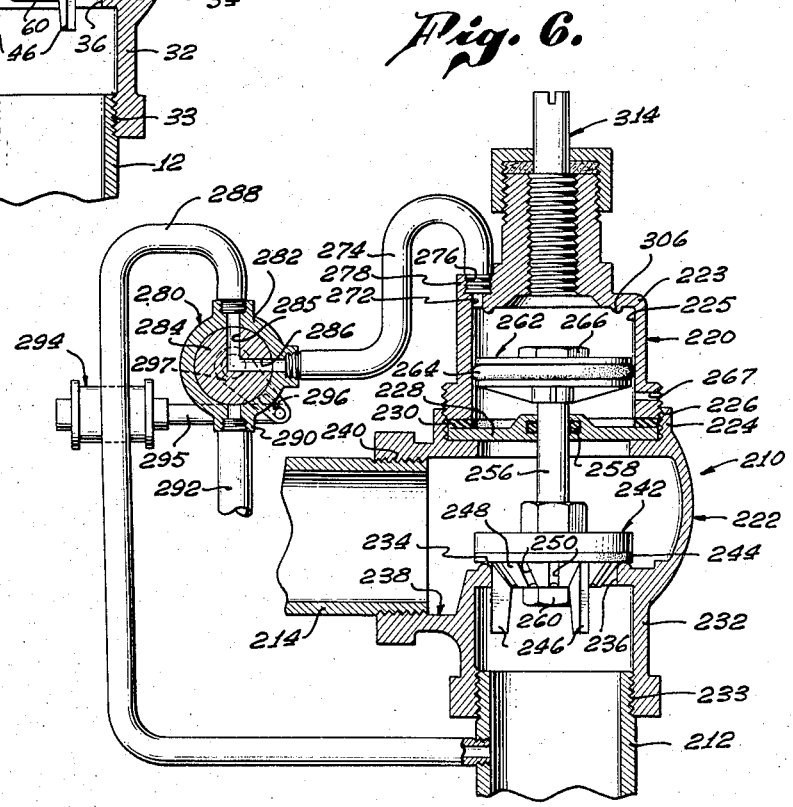
Fig. 6 is a vertical sectional view of a modified form of the invention including a normally open valve together with fragmentary portions of inlet and outlet conduits and a solenoid controlled pilot valve governing the operation of the principal valve. The valve is shown in closed position.

The valve thus far described, as previously mentioned, is normally closed and constitutes the preferred embodiment of the present invention. It is possible, however, to incorporate important features of the invention into a normally open valve, and such a device is shown in Fig. 6. For convenience, parts of the device shown in Fig. 6 corresponding to similar parts of the valve of Fig. 1 are designated by reference numerals 200 greater than their corresponding counterparts in the normally closed valve.

The embodiment of Fig. 6 differs structurally from that heretofore described in that there is no axial bore in the actuating rod 256 corresponding to bore 70 in rod 56; the conduit 274 from the pilot valve 280 communicates with the upper portion of the piston chamber 220, rather than with the lower portion as in Figs. 1, 2 and 5; and the lower portion of piston chamber 220 is continuously vented to atmosphere through channel or passageway 267 formed in the side wall of head 223 below the lower limit of travel of piston 262.

In operation of the valve of Fig. 6, it will be seen that when pressure fluid is admitted above piston 262 by pilot valve 280, the main valve 242 is driven to closed position by reason of the greater area of piston 262 as compared with that of valve 242, since only atmospheric pressure exists below piston 262. Venting or bleeding of pressure fluid from above piston 262 permits the valve to move to open position under the force of fluid in conduit 212.

It will be seen that the provision of stop or limiting means in the form of throttling rod 314 is especially useful in the normally open embodiment of the invention as shown in Fig. 6 so that, in case of malfunctioning of the control equipment, the valve may be held in closed position to avoid inadvertent flow of liquid.

Accordingly it will be seen that I have provided a novel valve for control of fluid flow through a conduit, actuation of the valve being accomplished by fluid pressure which may in turn be derived from the fluid being controlled or from an auxiliary source of pressure fluid. It will be understood that in a conventional sprinkler system or the like employing the invention herein, a number of valves will be used, the control for all valves being brought to a central point, and fluid pressure for moving the valve into either open (in the case of Fig. 1) or closed position (as in Fig. 6) may be conducted to the respective valve through relatively small fluid conduits such as copper tubing or the like. The specific control means herein schematically shown as including a solenoid actuated rotatable pilot valve is of course only exemplary of any of many such devices adapted for electric control. Alternatively, a manually actuable three-way pet cock or the like may be used.

Moreover, in both forms of the present invention manually adjustable throttling means are provided to delimit the maximum opening of the valve under the control of the pilot valve. Such manual throttling means may be conveniently used to insure that the valve remains closed regardless of force or lack of force exerted upon the valve by the control liquid. In each form of the valve means are desirably included on the upstream face of the movable closure member to insure smooth closing of the closure member with a minimum of shock to the water supply system to which the valve is connected.

Modifications and changes from the specific forms of the invention hereinabove shown and described will occur to those skilled in the art. All such modifications and changes not substantially departing from the invention are intended to be embraced within the scope of the appended claim.

I claim:

A fluid control valve comprising: a hollow body having an apertured horizontal partition therein dividing the interior of the body into an upper piston chamber and a lower valve chamber, the body having inlet and outlet ports formed therein communicating with the valve chamber; a vertically disposed actuating rod hermetically slidable in the partition aperture and extending into both said chambers; a closure member within the valve chamber fixed to said rod and arranged to selectively block said inlet port; a piston fixed to said rod within the piston chamber and hermetically separating said chamber into an upper piston chamber portion and a lower piston chamber portion; means for controllably introducing pressure fluid into said lower piston chamber portion, or selectively, bleeding fluid therefrom; means constantly communicating pressure fluid from said inlet port to said upper piston chamber portion; and means for selectively bleeding pressure fluid from the upper piston chamber portion at a rate greater than fluid is supplied thereto by said communicating means.

References Cited in the file of this patent

UNITED STATES PATENTS

| 412,789 | Probert | Oct. 15, 1889 |
| 430,089 | Sewall | June 10, 1890 |
| 817,040 | Buck | Apr. 3, 1906 |
| 967,702 | Anderson | Aug. 16, 1910 |
| 1,172,421 | Beck | Feb. 22, 1916 |
| 1,518,942 | Spear | Dec. 9, 1924 |
| 1,876,223 | Hagey | Sept. 6, 1932 |
| 1,898,248 | Gaines | Feb. 21, 1933 |
| 2,631,606 | Parks | Mar. 17, 1953 |